(12) United States Patent
Yen

(10) Patent No.: US 8,107,182 B2
(45) Date of Patent: Jan. 31, 2012

(54) SYSTEMS AND METHODS FOR ACCESSING READ CHANNEL REGISTERS USING COMMANDS ON DATA LINES

(75) Inventor: Johnson Yen, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 1132 days.

(21) Appl. No.: 11/506,436

(22) Filed: Aug. 18, 2006

(65) Prior Publication Data

US 2007/0233945 A1    Oct. 4, 2007

Related U.S. Application Data

(60) Provisional application No. 60/789,492, filed on Apr. 4, 2006, provisional application No. 60/789,480, filed on Apr. 4, 2006, provisional application No. 60/789,615, filed on Apr. 4, 2006, provisional application No. 60/789,481, filed on Apr. 4, 2006, provisional application No. 60/789,616, filed on Apr. 4, 2006.

(51) Int. Cl.
*G11B 5/02*    (2006.01)

(52) U.S. Cl. ......................................................... 360/67
(58) Field of Classification Search ................. 369/47.1, 369/47.5, 53.28; 360/51, 46, 48, 67, 39; 712/14; 703/24; 710/5
See application file for complete search history.

(56) References Cited

U.S. PATENT DOCUMENTS

| 6,337,778 | B1* | 1/2002 | Gagne ............................. 360/51 |
| 6,606,589 | B1* | 8/2003 | Tuma et al. ..................... 703/24 |
| 7,787,206 | B2* | 8/2010 | Yen ................................ 360/67 |
| 2007/0230004 | A1* | 10/2007 | Yen ................................ 360/39 |
| 2007/0230005 | A1* | 10/2007 | Yen et al. ....................... 360/39 |
| 2007/0260758 | A1* | 11/2007 | Yen ................................ 710/5 |

* cited by examiner

*Primary Examiner* — Fred Tzeng
(74) *Attorney, Agent, or Firm* — Garlick Harrison & Markison

(57) ABSTRACT

A system and method for providing an interface an interface between a read channel and a disk controller. The interface includes a plurality of differential pair signal lines operable to communicate data and control signals between the read channel and the hard disk controller. The data and control signal lines communicate operations for transferring data between the disk controller and the read channel.

11 Claims, 6 Drawing Sheets

SYSTEMS AND METHODS FOR ACCESSING READ CHANNEL REGISTERS USING COMMANDS ON DATA LINES

CROSS-REFERENCE TO RELATED APPLICATIONS

This application claims priority of:
1. U.S. Provisional Patent Application Ser. No. 60/789,492 filed on Apr. 4, 2006, titled "High-Speed Interface between a Read Channel and a Disk Controller," which is incorporated by reference in this application in its entirety;
2. U.S. Provisional Patent Application Ser. No. 60/789,480 filed on Apr. 4, 2006, titled "Systems and Methods for Accessing Read Channel Registers Using Commands on Data Lines," which is incorporated by reference in this application in its entirety;
3. U.S. Provisional Patent Application Ser. No. 60/789,615 filed on Apr. 4, 2006, titled "Systems and Methods for Accessing Preamp Registers Using Commands via Read Channel/Hard Disk Controller Interface," which is incorporated by reference in this application in its entirety;
4. U.S. Provisional Patent Application Ser. No. 60/789,481 filed on Apr. 4, 2006, titled "Read Channel/Hard Disk Controller Interface Including Power-on Reset Circuit," which is incorporated by reference in this application in its entirety;
5. U.S. Provisional Patent Application Ser. No. 60/789,616 filed on Apr. 4, 2006, titled "High-Speed Interface between a Read Channel and a Disk Controller," which is incorporated by reference in this application in its entirety;
6. U.S. patent application Ser. No. 11/506,621 filed on Aug. 18, 2006, titled "High-Speed Interface between a Read Channel and a Disk Controller," which is incorporated by reference in this application in its entirety;
7. U.S. patent application Ser. No. 11/506,420 filed on Aug. 18, 2006, titled "Systems and Methods for Accessing Preamp Registers Using Commands via Read Channel/ Hard Disk Controller Interface," which is incorporated by reference in this application in its entirety; and
8. U.S. patent application Ser. No. 11/506,490 filed on Aug. 18, 2006, titled "Read Channel/Hard Disk Controller Interface Including Power-on Reset Circuit," which is incorporated by reference in this application in its entirety.

BACKGROUND OF THE INVENTION

1. Field of the Invention

The invention relates to disk drive interfaces, and in particular to a systems and methods for controlling access to a disk drive read channel.

2. Description of the Related Art

Hard disk drives (HDDs) have become sufficiently dense to find new uses in very small computing devices. The sizes of today's disk drives can vary in size from about 0.85 to about 3.5 inches. Disks may also vary in storage capacity (up to 500 gigabytes), and speed (anywhere from 3,000 to 15,000 revolutions per minute, or RPMs) depending on the application and requirements such as capacity, access speed, durability, cost and power. Their reliability and accurate storage capabilities will only lead to increased demand in smaller and smaller applications (smaller MP3 players, handheld computers, etc.).

The advances that have been made in disk drive storage density have uncovered other limitations. As the density of disk drives increases, other factors may be limiting the extent to which the size of the application may be reduced. For example, components that make up the disk drive system may become physical obstacles to further shrinking an application.

Disk drives typically include a disk, at least two motors, a read/write head, a preamplifier, a read channel, a hard disk controller, and a motor controller. The hard disk controller and motor controller are typically on a host board. The preamplifier is typically located closer to the read-write head. The preamplifier often connects to the host board via a flex cable. These and other components take up space. A need exists to reduce the amount of space used by the components of a disk drive.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for a providing a high-speed interface between a disk controller and a read channel, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description, reference is made to the accompanying drawings that form a part hereof, and which show, by way of illustration, specific embodiments in which the invention may be practiced. Other embodiments may be utilized and structural changes may be made without departing from the scope of the present invention.

1. Disk Drive System

Examples of the present invention relate to interface schemes between a Read Channel and a disk controller in a disk drive system that advantageously reduce the number of signals and corresponding pins needed to connect the read channel and the disk controller. Examples of such interface schemes may include an architecture that may integrate the digital-logic-dominated devices into one SOC (System On a Chip) device, such as the disk controller, the motor controller, and the host controller, etc. advantageously reducing the overall system cost. A differential-pair signaling scheme is used for the interface because it provides good noise immunity on the flex cable and facilitates higher data transfer rate, such as, for example, a 666 Mbps data rate.

Figure 1:
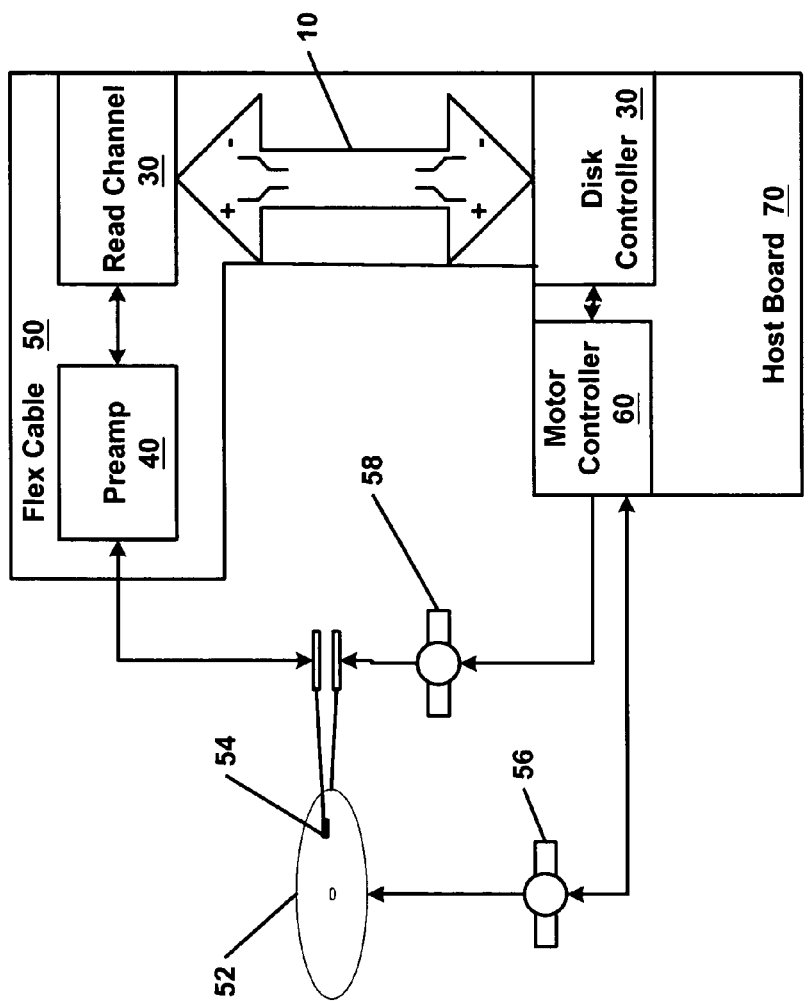
FIG. 1 is a schematic diagram of a disk drive system in which advantageous use of examples of the present invention may be made.

FIG. 1 is a schematic diagram of a disk drive system 5 showing an example of an interface 10 between a read channel 20 and a disk controller 30. The interface 10 is mounted in a flex cable 50 which contains the differential pair signal lines. The example system 5 in FIG. 1 depicts a preamplifier 40 and the read channel 20 mounted on the flex cable 50. The disk controller 30 and motor controller 60 reside on the host board 70.

The read channel 20 encodes and decodes the data going to and from the preamplifier 40. The read channel 20 detects bits in analog signal form from the preamplifier 40 and converts the analog signals into digital signals. The read channel 20 may use advanced mixed-signal and digital-signal processing technologies, in addition to advanced data-encoding schemes and digital filtering to optimize data detection. The read channel 20 also performs functions such as writing servo data during self-servo write operations and decoding servo information used for positioning drive heads during seeking and tracking operations.

In operation, the motor controller 60 drives a spindle motor 56 that spins a disk drive platter 52 and maintains the spin rate (RPMs). The motor controller 60 also drives a voice coil motor (VCM) 58 that moves a head gimbal assembly (HGA) 62. The HGA 62 drives a read/write head 54 from track to track during seek operations and then holds the HGA 62 on-track during read and write operations. The read/write head 54 reads signals from the disk drive platter 52 and communicates the signals to the preamplifier 40. The preamplifier 40 amplifies the low-level analog signals before they are sent to the read-channel 20 for digitization. The preamplifier 40 also amplifies data from the read channel 20 for the read/write head 54 to write on the platter 52. The disk controller 30 transfers data between the read channel 30 and host 70 during read and write operations. The disk controller 30 includes servo logic for managing the position of the read/write head 54 during seeks (moving from one track to a nonadjacent track) and during tracking (staying on a single track).

One problem with typical read channel/disk controller interfaces is the many single-ended digital signals used for data bus and control signals. A typical interface between a read channel and a disk controller may include many data and control lines connecting the two devices. The data lines may be digital lines that communicate digital information in parallel as digital words. If the read channel 20 and disk controller 30 are on separate devices as opposed to being on a single integrated circuit, each signal between them requires a line in the interface. Having too many lines in the interface takes up space. For example, in the case of a flex cable, adding more lines makes the cable wider. In examples of interfaces consistent with the present invention, signaling between the read channel 20 and the disk controller 30 is advantageously carried out over a reduced number of pins using differential pair signals.

2. Reduced Pinout Read Channel and Disk Controller Interface

Figure 2:
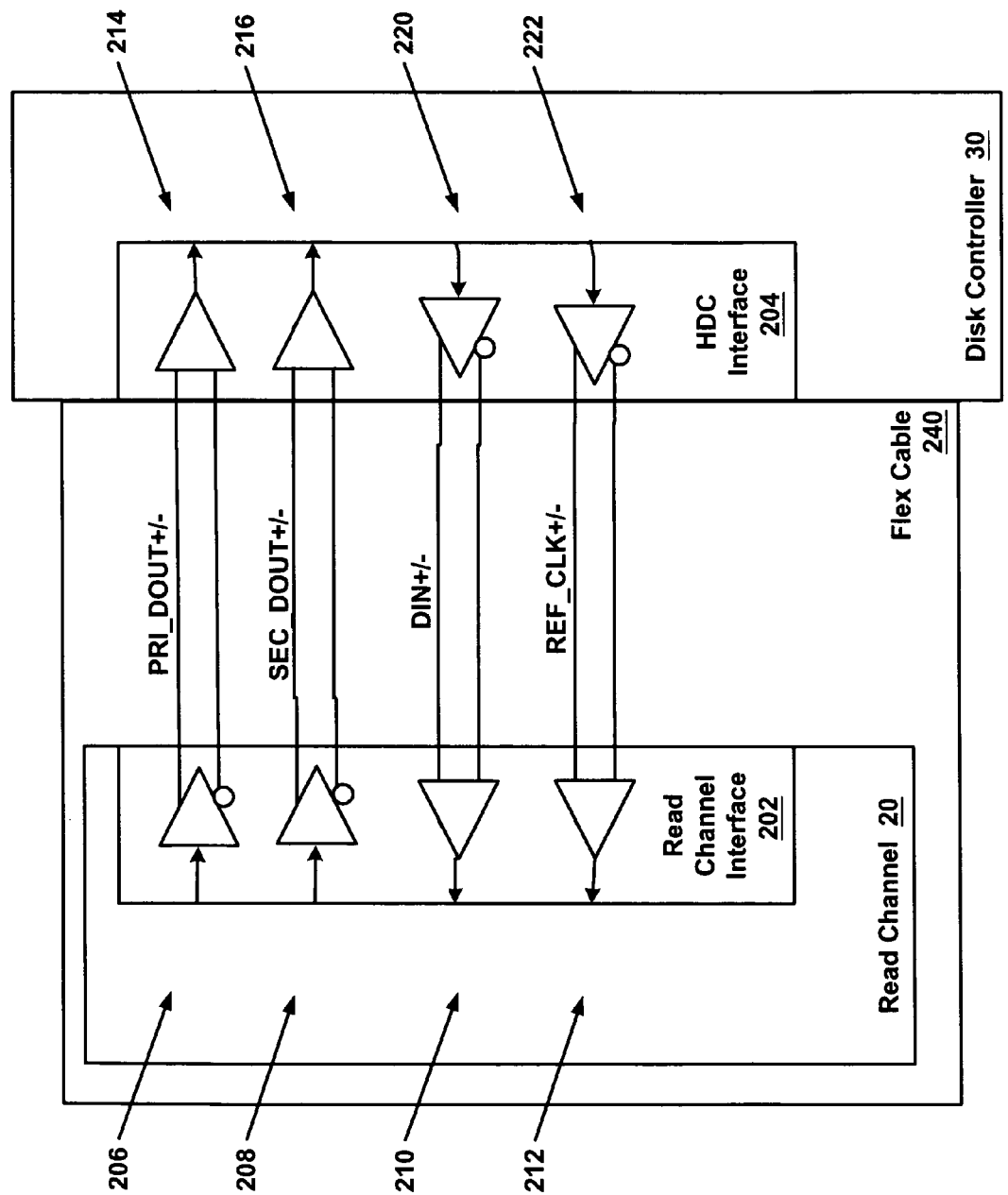
FIG. 2 is a schematic diagram of an example of an interface between a read channel and a disk drive controller according to examples of the present invention.

FIG. 2 shows an example of a read channel/disk controller interface according to embodiments of the present invention. One of ordinary skill in the art will appreciate that the present invention is not limited to examples described herein. The examples described herein are implemented in a hard disk storage system. One of ordinary skill in the art will appreciate that examples of interfaces consistent with the present invention may operate as well in other disk storage systems.

With respect to FIG. 2, communication between the read channel 20 and the disk controller 30 advantageously occurs through operation of four differential pair signal lines. The differential pairs in FIG. 2 include a primary data out pair PRI_DOUT+/−, a secondary data out pair SEC_DOUT+/−, a data in pair DIN+/−, and a reference clock pair REF_CLK+/−. The primary data out pair PRI_DOUT+/− is generated by a first read channel differential output driver 206 and received by a first disk controller differential input driver 214. The secondary data out pair SEC_DOUT+/− is generated by a second read channel differential output driver 208 and received by a second disk controller differential input driver 216. The data in pair DIN+/− is generated by a first disk controller differential output driver 216 and received by a first read channel differential input driver 210. The data reference clock pair REF_CLK+/− is generated by a second disk controller differential output driver 222 and received by a second read channel input driver 212. The read channel 20 transmits read/servo/register read data and a write data flow control command to the hard disk controller 30 on one or both of the differential pair, PRI_DOUT+/− and SEC_DOUT+/−.

The fixed high speed clock (REF_CLK+/−) is used for data transferred from the hard disk controller 30 to the read channel 20 on the DIN+/− pair and for data transferred from the read channel 20 to the hard disk controller 30 on the two PRI_DOUT+/− and SEC_DOUT+/− differential pairs. The use of the primary (PRI_DOUT+/−) and secondary (SEC_DOUT+/−) differential pairs as outputs provides for increased bandwidth during disk read operations.

Figure 3:
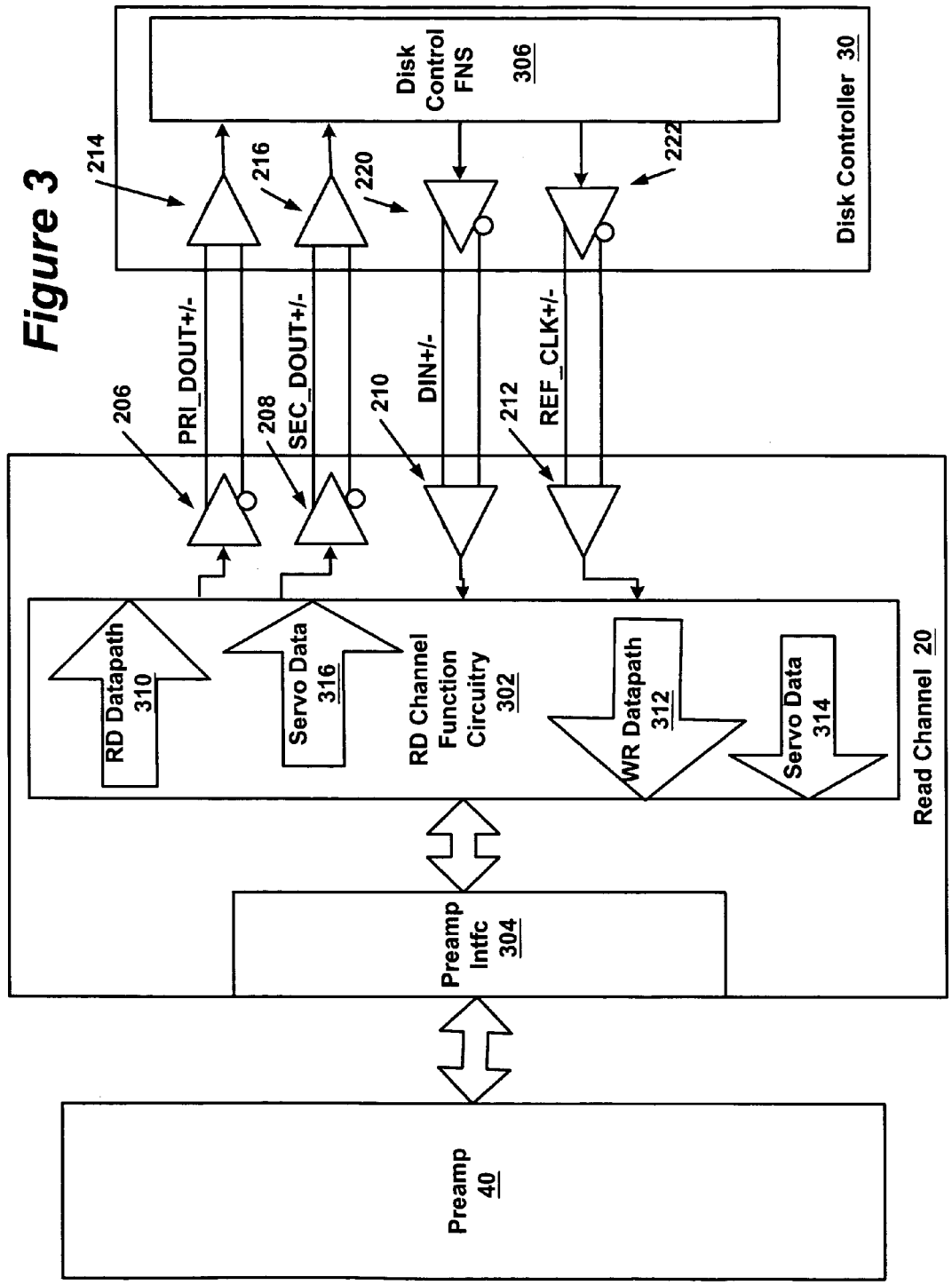
FIG. 3 is a more detailed schematic diagram of the interface between the read channel and disk drive controller of FIG. 4.

FIG. 3 is a more detailed depiction of the interface shown in FIG. 2. The disk controller 30 includes a disk controller function block 306. The disk controller function block 306 includes circuitry for performing the disk control functions. Such functions may include control of the disk via the read channel 20 and preamp 40. The interface in FIG. 3 shows the read channel drivers 206, 208, 210, 212 connected to a read channel function circuitry 302, which is connected to a preamp interface 304. FIG. 3 also depicts the read channel 20 connected to the preamp 40. The disk controller function block 306 may communicate commands that control the read channel 20 and/or the preamp 40 over the differential pair data lines (PRI_DOUT+/−, SEC_DOUT+/−, DIN+/−).

The read channel 20 in FIG. 3 includes read channel function circuitry 302, which includes circuitry implementing a read datapath 310, a servo data out path 316, a write datapath 312, and a servo data in path 314. The read datapath 310 includes analog to digital conversion circuitry for converting analog data signals received from the preamp 40 to digital bits. The read datapath 310 also includes decoding circuitry to convert the digital bits to digital words representing the data that was recorded on the disk. The servo data out 316 includes decoding circuitry to decode servo information used for positioning drive heads during seeking and tracking operations. The write datapath 312 includes circuitry to write data to the preamplifier 40, which writes the data on to the disk. The servo out data 314 includes circuitry to write servo data during self-servo write operations. The preamp interface 304 may include differential pair drivers to output data to the preamp 40 and input data as analog signals from the preamp 40.

The interface shown in FIG. 3 may include a read channel processing engine in the read channel function circuitry 302.

The read channel processing engine may be a digital signal processor, a general-purpose microprocessor or microcontroller, or any other suitable digital device or set of devices. In one example, the read channel processing engine includes digital logic that is addressable by a processor in the disk controller 30. The preamp 40 may also include a processing engine including digital circuitry that may perform logic operations operable to couple digital and analog signals between the read/write head 54 and the read channel 20.

Figure 4:
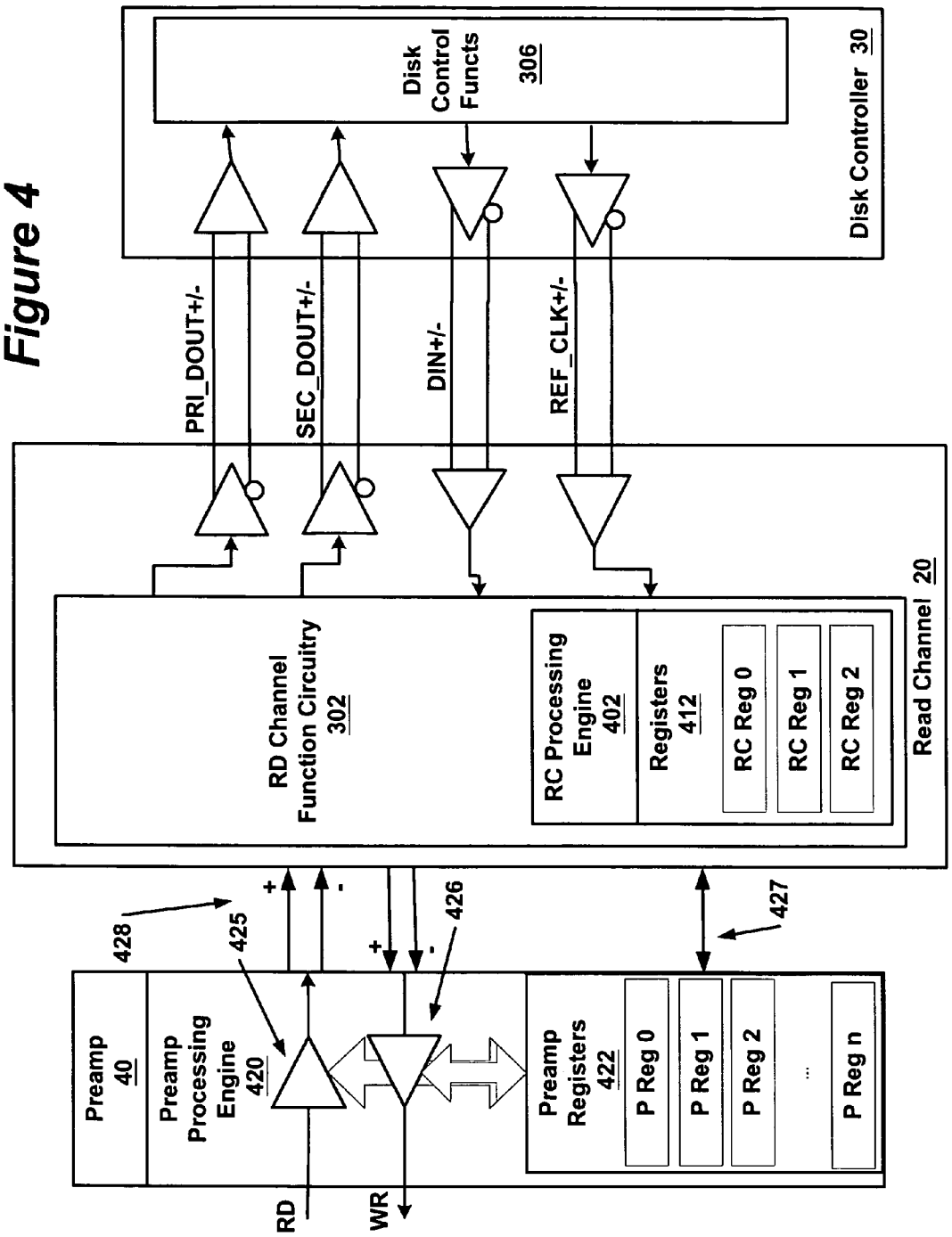
FIG. 4 is a schematic diagram of the interface of FIG. 3 depicting signal processing circuitry in the read channel and the preamp.

FIG. 4 is a block diagram of an example interface that includes a read channel processing engine 402 in the read channel 20 and a preamp processing engine 420 in the preamp 40. The read channel processing engine 402 includes a set of read channel registers 412 and the preamp processing engine 420 includes a set of preamp registers 422. The preamp processing engine 420 represents the digital and analog circuitry that implements functions performed by the preamp, which include reading/writing data from/to the read/write head 54 and communicating servo control signals to the HGA 62 and/or the spindle motor 56.

The disk controller 30 may communicate commands to the preamp 40 to configure the preamp 40 for operation. The commands may also be used to retrieve information regarding various aspects of the operation of the preamp 40. For example, the disk controller 30 may send commands to the preamp 40 to change the mode of the operation of the preamp 40 from a read mode to a write mode. The preamp 40 may operate over multiple channels, so that it communicates with more than one read/write head, or more than one motor. The disk controller 30 may send commands to the preamp 40 to operate the appropriate channel.

The preamp 40 includes analog circuitry, such as read and write amplifiers 425, 426, respectively, to perform functions, such as, processing signals read from or written to the disk. In one example preamp 40, digital logic, which includes the preamp registers 422, may be included in the preamp 40 to configure, to access and/or to control the analog functions of the preamp 40. The disk controller 30 may send commands to write data into the registers 422 via the read channel 20. The data may include information to configure, to control, and/or to access the preamp 40 functions in accordance with the particular preamp 40 device being used. In the preamp 40 of FIG. 4, the read channel 20 communicates preamp register access commands to the preamp processing engine 420 over a serial digital bus 427. The read channel 20 may communicate actual read and write data, that is, data that is to be written to or has been read from the disk, over differential pair signal lines 428.

FIG. 4 illustrates an example of the preamp 40, which includes a number, n, of preamp registers 422 depicted in FIG. 4 as P Reg 0, P Reg 1, P Reg 2, . . . P Reg n. Each register may be programmed to effect a function in accordance with the data contained therein. The function may be to control a reader function in the preamp 40, to control a write function, to select a BIAS mode control, to set read head output current limits, to select a head, to control whether the preamp in sleep or active mode, to perform fault detection, to select or control a servo write head, or to perform any function available on a particular preamp 40 device. In one example, the preamp 40 includes twelve 8 bit registers accessible by a data line connected to the read channel 20 to serially communicate sixteen bit words containing a register address and data to write into the addressed register. The actual data read from or written into the disk may be communicated on a separate set of differential pair lines between the read channel 20 and the preamp 40.

The read channel processing engine 402 may execute commands based on or received from the disk controller 30 over the differential pair data lines (PRI_DOUT+/−, SEC_DOUT+/−, DIN+/−). The types of commands executed by the read channel processing engine 402 shown in FIG. 4 may include:

Disk Data Read commands
Servo Read commands
Register Data Read commands
Disk Data Write commands
Servo Write commands
Register Data Write commands
Read/Write flow control commands
Debugging Read Channel Commands
Read Channel Memory Access commands
Interrupt notice The Data Register Read commands may be used to access the contents of the read channel registers 412 or the contents of the preamp registers 422. The commands are communicated serially via the single digital data line in the serial interface. The commands are communicated by sending a register address first. The read channel determines from the register address whether the command requires access to the preamp registers. The read channel then receives a command type or operation code ("opcode"). The read channel may compile the command and communicate it to the preamp 40 over the preamp interface 304.

As discussed above, FIGS. 2-4 show examples of an interface consistent with the present invention. The example interface between the read channel 20 and hard disk controller 30 in the disk system described above advantageously uses a small set of signals (four differential pairs) instead of the many single-ended digital signals used for data bus and control signals in typical interfaces.

3. Command Protocol

Figure 5:
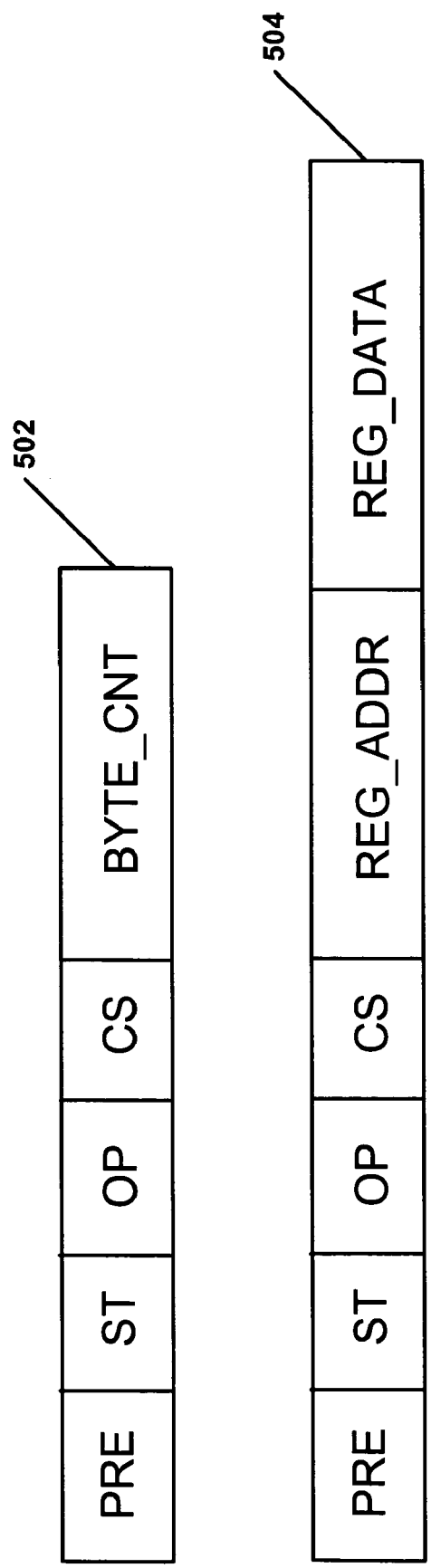
FIG. 5 shows examples of formats for command frames.

The example interfaces described above advantageously implement a command protocol for hard disk operations. In one example interface, all operations are initiated and executed by commands communicated between the read channel 20 and the disk controller 30. The commands have a format that includes fields such as a preamble, Start of Frame, Operation Code, Register Address/Byte Count, and Register Data. The commands may be used to implement the control over basic operations (such as Read-Gate, Write-Gate, Servo-Gate) and/or to provide access to registers in either the read channel 20 or preamp 40, or both. A set of arrival time commands may be used to indicate the beginning of Read-Gate, Write-Gate, and Servo-Gate cycles. An example of formats of some commands is shown in FIG. 5.

Example definitions of the commands transferred on the data_in signal pair DIN+/− from the disk controller 30 to the read channel 20 are described below. The commands may be used to indicate the status of read gate, write gate, and servo gate. The commands may also be used for access to both read channel registers 412 and preamp registers 422, and for data traffic flow control on the data_in signal pair DIN+/−. Examples of commands are listed as follows:

RG: Read Gate
WG: Write Gate
SG: Servo Gate
REG_RD: Register Read
REG_WR: Register Write
FC_ON: Flow Control On
FC_OFF: Flow Control Off When a command is transferred on the data_in serial differential pair lines DIN+/−, it is formed as a frame containing fields. Examples of frames for commands in an example interface are illustrated in FIG. 5. FIG. 5 includes a gate control command frame 502 and a register access command frame 504. The gate control command frame 502 and the register access command frame 504 both include a preamble (PRE) field, a start of frame (ST) field, and an operation code (OP) field. In one example interface, the preamble (PRE) field, start of frame (ST) field, and operation code (OP) field may be defined as follows:

Preamble (PRE): 2 consecutive 1 bits may be defined to be sent to the Read Channel to signal the beginning of a command. Fewer than 2 1-bits may be defined to cause the remainder of the command be ignored.

Start of Frame (ST): A 1'b0 pattern may be defined to indicate the start of the command.

Operation Code (OP): A 5-bit field may define the operation code of the command type as follows, for example:

| RG: | 5'b01001 | // Read Gate |
| WG: | 5'b10010 | // Write Gate |
| SG: | 5'b11110 | // Servo Gate |
| REG_RD_16: | 5'b00010 | // Register Read for 16-bit data |
| REG_RD_32: | 5'b00001 | // Register Read for 32-bit data |
| REG_WR_16: | 5'b00100 | // Register Write for 16-bit data |
| REG_WR_32: | 5'b00011 | // Register Write for 32-bit data |

Check sum (CS): A 3-bit field may be defined to hold the check sum of a 5-bit Operation Code. For example, the checksum may be "010" if the OP code is "01001."

The gate control command format 502 in FIG. 5 includes a field labeled BYTE_CNT, which in one example is a 16-bit field transmitted most significant bit first. It may be used to a byte count for the control commands, such as read gate, write gate, and servo gate.

The register access command format 504 includes the same preamble, start-of-frame, and operation code fields. The register access command format 504 further includes a REG_ADDR field to provide the address for the register access command, and a REG_DATA field, which may be either a 32-bit or 16-bit field depending on the content of the operation code field. The REG_ADDR is the last field of the register access command frame 504 and is used to contain the actual data. For a write operation, the bits in the REG_DATA field are sent to the read channel 20. For a read operation, the command from disk controller 30 sets the REG_DATA field to all zeros; the returned command from sent by the read channel 20 to the disk controller 30 is attached with the read out data in this field.

4. Commands for Read Channel Register Access

In one example of the interface, the disk controller 30 communicates commands on the serial differential pair interface to access registers on the read channel 20. Known read channel devices typically use a dedicated single-ended digital bus (with many data and control signals) to access the registers. In an example of an interface consistent with the present invention, commands may implement a format such as the register access command format 504 shown in FIG. 5.

In the register access command format 504 shown in FIG. 5, a command may be used for both register read and register write operations. The register access command format 504 may incorporate a register address and/or data to be written or read from read channel 20. For register write commands, the write data may be embedded in the REG_DATA field of the command 504 when the command is sent from disk controller 30 to the read channel 20. For register read commands, the REG_DATA field is empty when the command 504 is sent from disk controller 30 to the read channel 20. After the register data is ready to return to the disk controller 30, the same command format 504 may be sent from the read channel 20 to disk controller 30 with the read data embedded in the REG_DATA field. One of ordinary skill in the art will appreciate that FIG. 5 illustrates just one example of a command format that may be used in the interface.

5. Commands for Preamp Register Access

In an example of the interface consistent with the present invention, commands may be used to access preamp registers access via the read channel/hard disk controller interface. Preamp registers access is preferably implemented by communicating commands on the differential pair interface between read channel 20 and the hard disk controller 30. The read channel 20 decodes the commands and sends the corresponding signals on the interface between the read channel 20 and the preamp 40 to access the preamp registers. In one example, the read channel 20 formats a sixteen bit word with a register address in one 8-bit portion and data to be written to the register in the other 8-bit portion. For a command to read a preamp register 422, the preamp processing engine 420 may send a sixteen bit word in which one 8-bit portion identifies the register being read, and the other 8-bit portion contains the data read from the register. In another example, the disk controller 30 may format the preamp register access command and set an opcode that informs the read channel 20 to pass the command on to the preamp 40.

As discussed above, the registers may be written with information that configures the operation of the preamp 40. For the read register operation, the data returned by the preamp 40 will be communicated to the hard disk controller 30 through the read channel over the read channel-hard disk controller interface.

6. Interface Including Power-On-Reset

Figure 6:
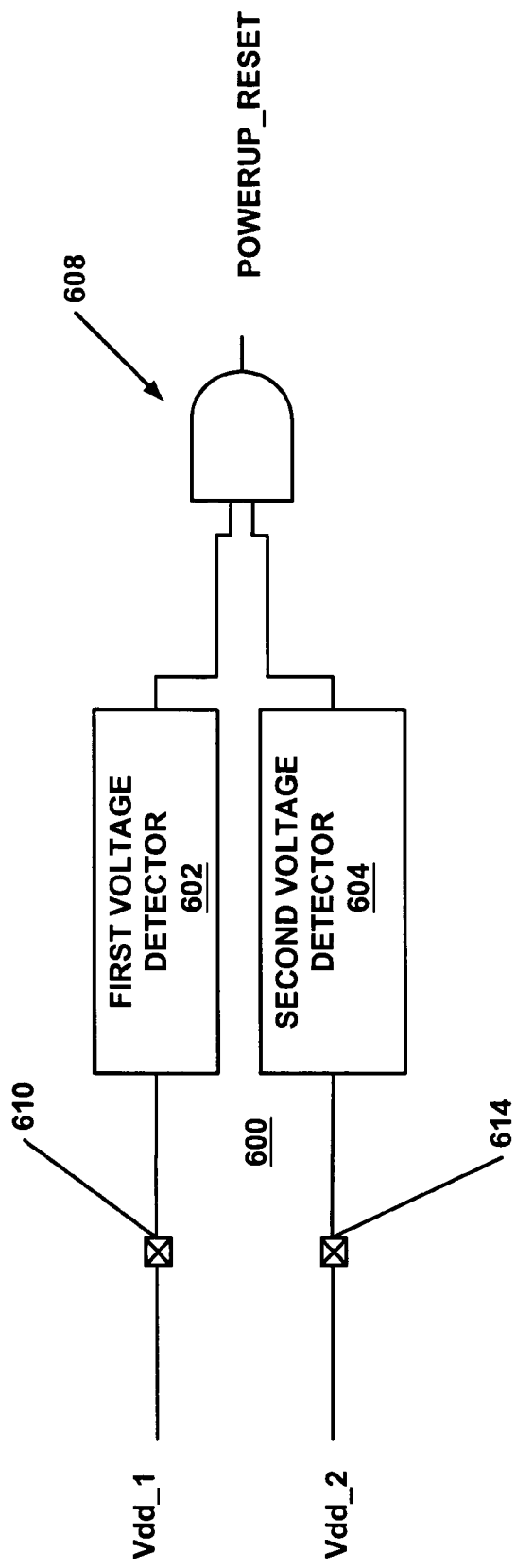
FIG. 6 is a block diagram of an example of a power-on reset circuit used in one example of the present invention.

In one example interface, a Power-On-Reset (POR) circuit 600 shown in FIG. 6 may be used to generate a reset signal. The example interface may implement the read channel 20 on a chip mounted in a flex cable and may implement reset circuitry to reset the read channel functions during, for example, a system reset of the disk drive system. In an example interface, the POR circuit 600 may be used in order to eliminate the need for a separate reset signal and thereby reduce the number of signals between read channel 20 and disk controller 30 by one. Since most of the signals communicated between the read channel 20 and disk controller 30 are used for data transfer and power/ground, there is no spare pin for the reset signal to be sent from disk controller 30 to read channel 20.

The POR circuit 600 measures the voltage level at a 3.3 volt supply pin (Vdd_33) 610 and a 1.2 volt supply pin (Vdd_12) 614 to determine whether to assert the reset circuitry inside the chip. The voltage levels at pins 610 and 614 are measured by a 1.2 volt detector 602 and a 3.3 volt detector 604. The output of the detectors 602, 604 are coupled to an AND gate 608. The output of the AND gate 608 is a reset signal (POWERUP_RESET). When the voltage at the pins 610, 614 is below the predefined threshold defined by the detectors 602, 604, the reset signal (POWERUP_RESET) is asserted until the voltage levels (1.2V and 3.3V) cross the corresponding threshold. Usually the reset signal remains in an asserted state with a certain delay.

While the present invention has been described with reference to certain embodiments, it will be understood by those skilled in the art that various changes can be made and equivalents can be substituted without departing from the scope of the present invention. It will be understood that the foregoing description of an implementation has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A disk drive system comprising:
   a read channel for a disk drive to read data from and write data to a disk, in which the read channel includes a processing engine and read channel registers to process commands from a disk controller;
   an interface coupled between the read channel and the disk controller, in which a plurality of differential pair signal lines are resident thereon to communicate data between the read channel and the disk controller, and commands from the disk controller to the read channel utilize same differential pair of lines as data input from the disk controller to the read channel;
   a preamplifier coupled to the read channel and separate from the read channel, in which the preamplifier includes preamp registers to configure operation of the preamplifier; and
   wherein the read channel is operable to receive register access commands from the disk controller over the one differential pair of lines used for data input, in which the register access commands access the read channel registers or the preamp registers, and wherein the read channel, the interface and the preamplifier reside on a flex cable coupling the disk controller to a disk head.

2. The disk drive system of claim 1 where at least one register access command has a command format comprising an operation code field and a register address field to identify one of the read channel registers.

3. The disk drive system of claim 2 where the command format further comprises a register data field to contain data read from a disk during a read operation.

4. An interface in a disk drive system between a disk head and a disk controller, the interface comprising:
   a read channel to read data from and write data to the storage disk, in which the read channel includes a processing engine and read channel registers to process commands from the disk controller;
   a preamplifier coupled to the read channel and separate from the read channel, in which the preamplifier includes preamp registers to configure operation of the preamplifier;
   a plurality of differential pair signal lines operable to communicate data between the read channel and the disk controller, and commands from the disk controller to the read channel utilize same differential pair of lines as data input from the disk controller to the read channel; and
   wherein the read channel is operable to receive register access commands from the disk controller over the one differential pair of lines used for data input, in which the register access commands access the read channel registers or the preamp registers, and wherein the read channel, the preamplifier and the plurality of differential pair signal lines reside on a flex cable coupling the disk controller to a disk head.

5. The interface of claim 4 where at least one register access command has a command format comprising an operation code field and a register address field to identify one of the read channel registers.

6. The interface of claim 5 where the command format further comprises a register data field to contain data read from a disk during a read operation.

7. The interface of claim 4 wherein the register access commands transmitted by the disk controller comprise a first portion for specifying a register address.

8. The interface of claim 7 wherein the register access commands transmitted by the disk controller comprise a second portion for specifying one of a command type or an operation code.

9. The interface of claim 8 wherein the specified one of the command type or operation code comprises one of:
   a Register Data Read command;
   a Disk Data Read command;
   a Servo Data Read command;
   a Disk Data Write command;
   a Servo Write command;
   a Register Data Write command;
   a Read/Write flow control command;
   a Debugging Read Channel Command;
   a Read Channel Memory Access command; and
   an Interrupt Notice.

10. The interface of claim 9 wherein the Register Data Read command is used to access contents of read channel registers.

11. The interface of claim 9 wherein the Register Data Read command is used to access contents of preamp registers.

* * * * *